FREQUENCY AND TIME CONTROL

Filed Dec. 22, 1961

INVENTOR
D. L. WHITE
BY Roy M. Porter, Jr.
ATTORNEY

United States Patent Office 3,129,346

Patented Apr. 14, 1964

3,129,346

FREQUENCY AND TIME CONTROL

Donald L. White, Mendham, N.J., assignor to Bell Telephone Laboratories, Incorporated, New York, N.Y., a corporation of New York Filed Dec. 22, 1961, Ser. No. 161,565

9 Claims. (Cl. 310—8)

Figure 1:
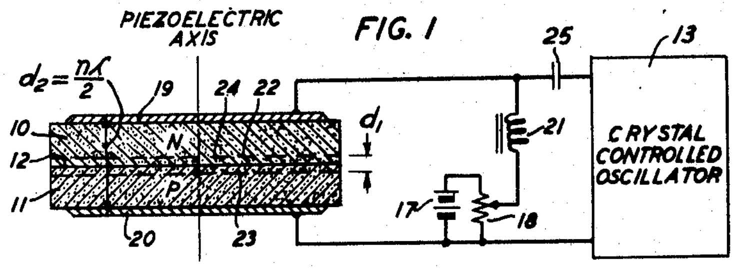

This invention relates to resonators, frequency standards and time standards. More particularly, it relates to electromechanical resonators in which the mechanical vibrations of a physical member are utilized to provide precise standards of frequency and time.

For many years the most precise standards of frequency and time have been the piezoelectrically generated vibrations of thin members cut in particular directions from single crystals of piezoelectric material, usually quartz. The frequency at which such a member vibrates is primarily determined by the thickness of the member, which has a fundamental resonance when this thickness is in the order of one-half wavelength of ultrasonic vibrations in the material. Operation at higher frequencies has required the members to be made thinner and thinner. For example, quartz crystals have been made in wafers that have thicknesses as small as 25 microns and produce resonance frequencies in fundamental modes as high as 30, or at the very best, 50 megacycles. Even wafers of this size present unwarranted difficulties in handling, bonding, mounting, etc. As commercial interest has been extended to even higher frequencies in the microwave range and beyond, the alternative to impossibly thin wafers has been to operate the crystal at a subharmonic, using the overtones or harmonics of the crystal fundamental. However, since piezoelectric coupling between the mechanical and electrical circuit decreases as the square of the overtone, it becomes increasingly difficult to efficiently connect the vibrating crystal to the circuit. The art has, therefore, been faced with the equally unsatisfactory alternatives of operating efficiently with a low order overtone from a crystal element too fragile to handle mechanically or of inefficient operation with a high overtone from a crystal element of satisfactory mechanical size.

It is, therefore, an object of the invention to increase the coupling between a vibrating mechanical element and an electrical circuit at high frequencies.

It is a more specific object to provide a mechanically vibrating element of convenient mechanical thickness with which an electrical circuit may be efficiently coupled for operation with an overtone of the fundamental vibration of the element.

In accordance with the present invention a composite element is provided in which the area in which piezoelectric coupling takes place is restricted to a region of thickness that is a small fraction of the thickness of the total element. Analysis and experiment have shown that in such a structure the electromechanical coupling varies more nearly inversely as the overtone rather than inversely as the square of the overtone, the latter being the relationship when the piezoelectric region encompasses the entire body as in the quartz crystals. It will be shown that maximum coupling is, in fact, obtained when the thickness of the piezoelectric region is equal to one-half wavelength of the resonant overtone even when the total element thickness is many multiples of this wavelength.

In a preferred embodiment of the invention to be illustrated, such a thin piezoelectric element is obtained by employing the high resistivity depletion layer formed at a non-ohmic junction in semiconductive piezoelectric material. Piezoelectric effects have been observed only recently in a number of the materials here contemplated because they are generally too conductive to support an electrical field large enough to produce a piezoelectric response. In the depletion layer, however, the charge carriers present in the materials have been swept out by a direct-current electric field so that the layer behaves as if it were a narrow, high resistivity strata in which a piezoelectric field can be supported. The alternating-current electrical circuit is piezoelectrically coupled only to this narrow layer which drives, in turn, the remainder of the vibrating body with the improved electromechanical coupling outlined above. Special features of the invention reside in the facility with which the thickness of this layer may be adjusted, and while not determinative of the resonant frequency of the vibrating body, the thickness of the layer can serve as a vernier adjustment on the resonant frequency. A further feature of the invention resides in the way in which temperature compensation can be obtained by the use of this vernier adjustment.

Figure 2:
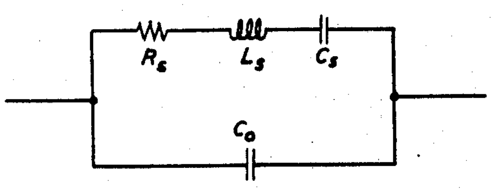
Figure 3:
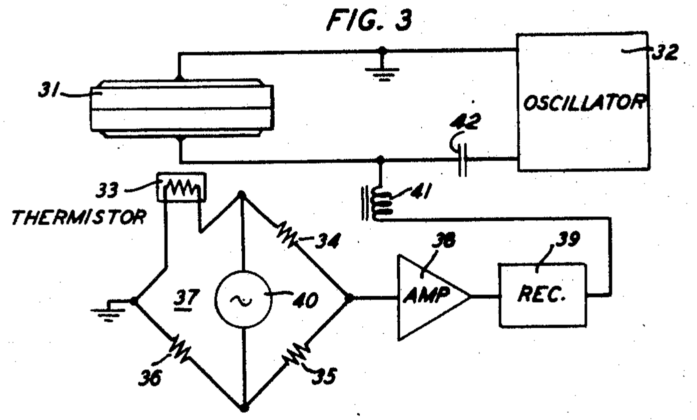
Figure 4:
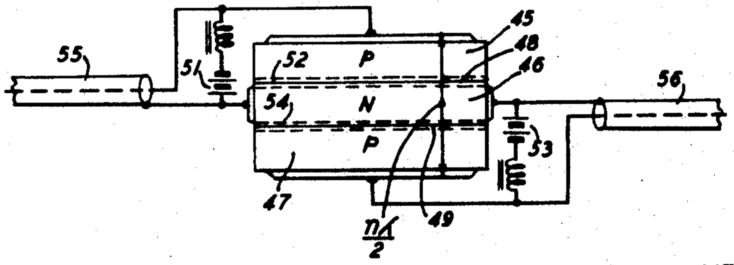

These and other objects, the nature of the present invention, its various features and advantages will appear more fully upon consideration of the various illustrative embodiments now to be described in detail in connection with the accompanying drawings, in which:

FIG. 1 is a cross-sectional view of a resonant element in accordance with the invention which, by way of illustrating one application thereof, is connected schematically as part of a crystal controlled oscillator;

FIG. 2, given for the purpose of explanation, is a schematic representation of the equivalent circuit of the resonator of FIG. 1;

FIG. 3 is a schematic representation of a resonator in accordance with the invention in a temperature compensating circuit; and FIG. 4 is a representation of an electromagnetic wave filter employing a double resonator in accordance with the invention.

Referring more marticularly to FIG. 1, an illustrative example of a resonant element in accordance with the invention is shown as the frequency control of an oscillator circuit 13. The resonating element itself comprises a thin, flat section 10 of low resistivity, n-type, semiconductive material and a second thin, flat section 11 of low resistivity, p-type, semiconductor material. Preferably, sections 10 and 11 are formed of a single crystal and the sections make intimate contact along the interface junction 12 which extends parallel to the surfaces of sections 10 and 11. The materials of sections 10 and 11 may comprise one of the group III–V or II–VI compounds that are piezoelectric in a high resistivity form. Preferred materials are GaAs, Gap, GaSb, InAs, InSb, BP, properly stabilized AlP, AlAs, AlSb from group III–V, and CdS, ZnS, ZnO, CdSn, ZnSn and MgTe from group II–VI. The basic composition of the sections may be the same as or different from each other. The material of section 10 has been rendered n-type by the inclusion of any suitable donor impurity and the material of section 11 has been rendered p-type by the inclusion of any suitable acceptor impurity. Typically, a low resistivity in the range of 0.005 ohm centimeters may be employed which results from a doping of at least $10^{17}$ ionized impurity atoms per cc. The details of fabricating such a junction are well known in the semiconductor art and form no part of the present invention. The junction may be formed by the techniques known as crystal pulling, rate-growing, epitaxial depositing, alloying or diffusion.

However formed, the crystal orientation of the material of section 10 or 11 is such that one of the piezoelectric axes of the material is parallel to the thickness dimensions which makes it normal to the flat faces of the sections and to the extent, junction 12, these faces and the junction being preferably parallel to each other. For example, the piezoelectric axis of the cubic materials listed above, such as gallium arsenide, is the [110] and equivalent axes for shear vibrational modes and the [111] and equivalent axes for longitudinal vibrational modes. For the materials of hexagonal or wurtzite structure the piezoelectric axis is along the hexagonal axis for longitudinal modes and normal to the hexagonal axis for shear modes. The cross-section parallel to junction 12 and normal to the selected piezoelectric axis may be square, rectangular, ovoid or round. Whatever shape is preferred for the particular application, the resulting composite structure is then dimensioned according to proportions conventional in the resonant crystal art so that the composite structure is physically or mechanically resonant for the mode desired at the frequency of operation. In general, this requires a total thickness dimension for sections 10 and 11, designated on FIG. 1 as $d_2$, that is a multiple of half wavelengths at the desired operating frequency as measured in ultrasonic wavelengths within the material.

Ohmic contacts 19 and 20 are formed upon suitable surfaces of sections 10 and 11 by any suitable means. The minute loading of these electrodes will have been taken into account when determining the resonant dimensions of the structure. The structure is suitably supported for the intended mode of vibration by means not shown. All the details of dimensioning, shaping, supporting and electrode forming may be identical to corresponding details employed and well known in the resonant crystal art, such as that employing quartz crystals, and form no part of the present invention. Reference is had to the text "Piezoelectricity" by W. G. Cady, McGraw Hill, 1946, for further information concerning these details.

Unlike other resonant crystals, however, junction 12 is back-biased (positive potential applied to the n-type element) by a variable direct-current from the source illustrated by battery 17 and potentiometer 18, connected to the junction by contacts 19 and 20. Inductance 21 is included in series in the bias circuit to provide a high impedance for alternating currents at the operating frequency and a capacitor 25 is inserted between the resonator and the components of oscillator 13 to block the bias from the oscillator.

When a p-n junction is back-biased as described, the mobile charge carriers (holes in the p material and free electrons in the n material) are pulled away from the junction to form what is referred to in the semiconductor art as a depletion layer. This layer is represented schematically on the drawing by reference numeral 24 designating the volume between the dotted lines 22 and 23. The thickness of the layer physically increases as the bias voltage is increased until the peak inverse voltage is reached at which time the junction breaks down. Until breakdown is reached the layer has a high resistivity or low conductivity and is responsible for the high resistance exhibited by the back-biased p-n junction rectifiers. These characteristics of a depletion layer are well known.

Thus, while the bulk of the material comprising sections 10 and 11 is too conductive to support a piezoelectric field, the carrier population in depletion layer 24 has been reduced to a degree that the layer becomes sufficiently non-conductive to support such a field. Layer 24, therefore, becomes a very thin, highly efficient driving element which drives the composite element at its natural vibration period.

The thickness $d_2$ of the composite element rather than the thickness $d_1$ of layer 24 itself determines the resonant frequency of the combination. However, as is disclosed in more detail in my copending application Serial No. 153,088, filed November 17, 1961, the velocity of ultrasonic energy in depletion layer 24 is higher than it is in the normal semiconductor from which layer 24 was formed. Since the ultrasonic dimension of layer 24 constitutes part of the total dimension of the composite element, varying the thickness of layer 24 by varying the magnitude of the back-bias voltage by potentiometer 18, varies the percentage of the total thickness having a high velocity and, therefore, varies the total thickness in terms of ultrasonic wavelengths. Thus, variation of the back-bias constitutes a vernier adjustment upon the resonant frequency of the composite element. Such is a possibility which did not exist with prior art piezoelectric oscillators.

FIG. 2 shows the equivalent circuit of the resonator of FIG. 1. This circuit is typical of the equivalent circuit of other forms of piezoelectric resonators. $C_0$ is the capacitance between the electrodes 19 and 20, $R_s$, $C_s$ and $L_s$ represent the components of the piezoelectrically produced resonance. The ration of $C_0/C_s$ is referred to in the art as the capacitance ratio or sometimes as the piezoelectric ratio. It is a direct measure of the piezoelectric or electromechanical coupling of the resonator. A small capacitance ratio represents high activity and high electro-mechanical coupling. Further details, definitions and deviations of these terms may be found in any standard textbook on piezoelectricity, such as the one by W. G. Cady noted above. As described in this and other textbooks, the capacitance ratio of an ordinary piezoelectric crystal in which the region of piezoelectric field extends throughout the thickness of the crystal, depends upon the harmonic or overtone $n$ with respect to which performance is analyzed in the following way:

$$\frac{C_0}{C_1}=\frac{\pi^2}{8}\frac{n^2}{k^2} \quad (1)$$

where $k^2$ is the square of the electromechanical coupling coefficient of the particular piezoelectric material. Thus, it is seen that the capacitance ratio increases as the square of the overtone $n$.

However, in a resonator in accordance with the invention when the thickness $d_1$ of the region of piezoelectric action constitutes only a portion of the total thickness $d_2$ of sections 10 and 11, an equation corresponding to Equation 1 may be shown to be approximately $$\frac{C_0}{C_s}=\frac{\pi^2}{2a(d_1, d_2)}\frac{d_1}{d_2}\frac{n^2}{k^2} \quad (2)$$

where $$a(d_1, d_2)=\left|2\cos\frac{2\pi}{\lambda}(d_2-d_1)\left(1-\cos\frac{2\pi}{\lambda}d_1\right)-\sin\frac{2\pi}{\lambda}(d_2-d_1)\sin\frac{2\pi d_1}{\lambda}\right| \quad (3)$$

Thus, the smaller $d_1$ is with respect to $d_2$ the smaller the capacitance ratio and the greater the electromechanical coupling. Equation 2 experiences an optimum in this respect when $$d_1=\frac{\lambda}{2} \quad (4)$$

for which $$d_2-d_1=\frac{2n-1}{\lambda}$$

$$\frac{d_1}{d_2}=\frac{1}{n}$$

$$a(d_1, d_2)=4$$

and Equation 2 reduces simply to $$\frac{C_0}{C_1}=\frac{\pi^2}{8}\frac{n}{k^2} \quad (5)$$

showing that the capacitance ratio increases directly as the overtone $n$.

The other extreme is reached when the region of piezoelectric activity fills the entire thickness of the member, that is, when $d_1$ approaches $d_2$. Under this condition, Equation 2 reduces to Equation 1 and the coupling becomes that of an ordinary piezoelectric member of the prior art.

Having thus demonstrated the primary advantages of the invention, several other features may now be examined. For example, all crystal resonators have a substantial frequency versus temperature coefficient over all but a limited temperature range and this is known to be one of the main difficulties in the use of crystal controlled oscillators. It was noted above that variation of the back-bias voltage varies the effective thickness of and, therefore, the resonant frequency of the vibrating body. Thus, FIG. 3 illustrates how this variation may be employed to obtain temperature compensation. The composite resonator 31 and oscillator 32 correspond in all respects to those illustrated in FIG. 1 except that bias for resonator 31 is derived from a bridge 37. Bridge 37 comprises any temperature sensitive element 33, such as a thermocouple or a thermistor, physically associated with resonator 31 and resistors 34, 35 and 36. An alternating-current source 40 is connected across one diagonal of bridge 37. The output of the bridge is taken from the opposite diagonal, is amplified by amplifier 38, rectified in rectifier 39, and applied to resonator 31 through isolating inductance 41 together with blocking capacitor 42. Bridge 37 is adjusted to provide the bias required for oscillation of resonator 31 at the desired frequency. A temperature change alters the resistance of thermistor 33. Unbalance of bridge 37 changes the bias and corrects the frequency of oscillation. It is understood that only the most basic form of thermistor bridge circuit has been illustrated and other forms may readily be devised by those skilled in the art.

Like every other resonant circuit, the electromechanical resonator of FIG. 1 may be used as a filter. However, a substantially greater frequency discrimination is obtained by the double section resonator shown in FIG. 4. Thus, a mechanically resonant p-n-p junction is shown comprising a section 46 of n-type material forming junctions 48 and 49 on opposite faces with sections 45 and 47 of p-type material. Alternatively, the sections may be in the form of an n-p-n junction. In either event, the combined thickness of sections 45, 46 and 47 is a multiple of $\lambda/2$ wavelengths of the frequency to be filtered. Back-bias is applied across junction 48 from source 51 to produce depletion layer 52. A similar back-bias is applied across junction 49 from source 53 to produce depletion layer 54. An input signal applied across junction 48 by way of line 55 produces a piezoelectric field in layer 52, which causes the entire body to vibrate when the electrical input signal frequency corresponds to the mechanical resonance of the composite body. A piezoelectric response in layer 54 reconverts the vibration into an electrical signal which is delivered to output line 56. There is no direct electrical coupling between input 55 and output 56 so the only transfer of energy takes place by way of the mechanical resonance. All other features and advantages of the invention as described with reference to FIG. 1 apply equally to the filter embodiment of FIG. 4.

The principles of the invention have been illustrated by way of a thin piezoelectric region formed by a depletion layer in a p-n junction. While this represents the preferred and most advantageous way in which such a thin region may be formed, it should be noted that applicant's recognition of the manner in which increased electromechanical coupling can be obtained is applicable to thin regions formed in other ways. For example, a depletion layer may be formed adjacent to non-ohmic contacts of other types. Furthermore, the process of epitaxially depositing as described in my copending application Serial No. 147,253, filed October 24, 1961, now abandoned but corresponding to Patent No. 623,992, issued November 14, 1962, in Belgium, or Patent No. 1,345,029, issued October 28, 1963, in France, represents an alternative way in which such a layer may be produced.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An electromechanical resonator for producing resonance in a predetermined frequency range comprising a thin flat body of dimensions for which said body is mechanically resonant at a sub-harmonic of said predetermined frequency, means for forming within said body a piezoelectric region that extends transversely with respect to the thickness of said body, the thickness of said region being a small fraction of the thickness of said body, and electrical circuit means for coupling with a piezoelectric field in said region.

2. The resonator according to claim 1 wherein the thickness of said body is several integral multiples of half wavelengths of mechanical energy in said body and wherein the thickness of said region is in the order of one-half wavelength of said energy.

3. The resonator according to claim 1 wherein said region comprises a depletion layer in semiconductive piezoelectric material.

4. The resonator according to claim 1 wherein said body partly comprises a section of n-type semiconductive material and partly comprises a section of p-type semiconductive material and having means including a source of bias applied to said sections for forming a depletion layer between said sections.

5. The resonator according to claim 1 wherein the faces normal to the thickness dimension of said body are parallel to each other and to the extent of said region and also normal to the piezoelectric axis of the material in said region.

6. An electromechanical resonator for producing resonance in a predetermined frequency range comprising a thin flat plate of n-type semiconductive material forming a p-n junction with a thin flat plate of p-type semiconductive material, at least one of said plates being formed of material which has piezoelectric properties when in high resistivity form, the outer faces of said plates being parallel to each other and to the extent of said junction and being spaced apart an integral multiple of half wavelengths of mechanical energy in said materials in said predetermined range, and means for applying a bias potential across said junction to form a depletion layer of thickness substantially one-half wavelength of said energy in said predetermined range.

7. The resonator according to claim 6 wherein said means for applying said bias potential includes a temperature-sensitive means for varying said bias in response to temperature changes of said plates.

8. The resonator according to claim 6 including a pair of plates of one conductivity type material adjacent to opposite faces of a third plate of the opposite conductivity type material, electrical circuit means for coupling an input signal with the junction formed between said third plate and one of said pair of plates, and a second electrical circuit means for coupling an output signal from the junction formed between said third plate and the other of said pair of plates.

9. The apparatus of claim 1 wherein said material is one selected from the class consisting of group III–V compounds and group II–VI compounds wherein said groups refer to the periodic table of elements.

References Cited in the file of this patent

UNITED STATES PATENTS

| | | |
|---|---|---|
| 2,929,885 | Mueller | Mar. 22, 1960 |
| 2,998,575 | Mason | Aug. 29, 1961 |